United States Patent
Parikh et al.

(10) Patent No.: US 7,714,877 B1
(45) Date of Patent: May 11, 2010

(54) APPARATUS, SYSTEM, AND METHOD FOR DETERMINING CLIPPING DISTANCES

(75) Inventors: Vimal S. Parikh, Fremont, CA (US); Lordson L. Yue, Foster City, CA (US)

(73) Assignee: Nvidia Corporation, Santa Clara, CA (US)

( * ) Notice: Subject to any disclaimer, the term of this patent is extended or adjusted under 35 U.S.C. 154(b) by 380 days.

(21) Appl. No.: 11/312,965

(22) Filed: Dec. 19, 2005

(51) Int. Cl.
G09G 5/00 (2006.01)
(52) U.S. Cl. ............... 345/620; 345/619; 345/621; 345/622; 345/418; 345/419; 345/420; 345/421; 345/422
(58) Field of Classification Search ......... 345/419–426, 345/619–622
See application file for complete search history.

(56) References Cited

U.S. PATENT DOCUMENTS

| | | | |
|---|---|---|---|
| 3,889,107 A | 6/1975 | Sutherland | |
| 4,958,305 A | 9/1990 | Piazza | |
| 5,051,737 A | 9/1991 | Akeley et al. | |
| 5,224,210 A | 6/1993 | Pinedo et al. | |
| 5,420,980 A | 5/1995 | Pinedo et al. | |
| 5,428,779 A | 6/1995 | Allegrucci et al. | |
| 5,455,985 A | 10/1995 | Flurry et al. | |
| 5,564,009 A | 10/1996 | Pinedo et al. | |
| 5,572,657 A | 11/1996 | Pinedo et al. | |
| 5,613,052 A | 3/1997 | Narayanaswami | |
| 5,720,019 A | 2/1998 | Koss et al. | |
| 5,838,331 A | 11/1998 | DeBry | |
| 5,877,773 A | 3/1999 | Rossin et al. | |
| 5,949,421 A | 9/1999 | Ogletree et al. | |
| 5,986,669 A | 11/1999 | Kirkland | |
| 6,052,128 A * | 4/2000 | Narayanaswami et al. | 345/620 |
| 6,052,129 A * | 4/2000 | Fowler et al. | 345/620 |
| 6,061,066 A | 5/2000 | Priem | |
| 6,137,497 A | 10/2000 | Strunk et al. | |
| 6,181,352 B1 | 1/2001 | Kirk et al. | |
| 6,208,361 B1 | 3/2001 | Gossett | |
| 6,359,630 B1 | 3/2002 | Morse et al. | |
| 6,459,438 B1 | 10/2002 | Mang | |
| 6,507,348 B1 * | 1/2003 | Mang et al. | 345/622 |
| 6,512,524 B1 | 1/2003 | Mang | |
| 6,552,723 B1 | 4/2003 | Duluk, Jr. et al. | |
| 6,567,084 B1 * | 5/2003 | Mang et al. | 345/426 |
| 6,577,305 B1 | 6/2003 | Duluk, Jr. et al. | |
| 6,597,363 B1 | 7/2003 | Duluk, Jr. et al. | |
| 6,621,495 B1 | 9/2003 | Cook et al. | |
| 6,686,924 B1 | 2/2004 | Mang et al. | |
| 6,774,895 B1 * | 8/2004 | Papakipos et al. | 345/422 |
| 6,782,432 B1 | 8/2004 | Nelson et al. | |
| 6,928,646 B1 | 8/2005 | James et al. | |

(Continued)

OTHER PUBLICATIONS

U.S. Appl. No. 11/195,389, filed Aug. 2, 2005, Moreton et al.

*Primary Examiner*—Jin-Cheng Wang
(74) *Attorney, Agent, or Firm*—Cooley Godward Kronish LLP

(57) ABSTRACT

An apparatus, system, and method for determining clipping distances are described. In one embodiment, a graphics processing apparatus includes a clipping unit and an instruction memory connected to the clipping unit. The instruction memory includes a clipping program to direct the clipping unit to perform clipping operations. The clipping program includes a clipping distance instruction to determine a clipping distance with respect to any of a set of clipping planes.

13 Claims, 5 Drawing Sheets

U.S. PATENT DOCUMENTS

| | | |
|---|---|---|
| 7,088,359 B2 | 8/2006 | Huang et al. |
| 7,292,242 B1 * | 11/2007 | Wittenbrink et al. ........ 345/421 |
| 7,292,254 B1 * | 11/2007 | Yue et al. .................... 345/620 |
| 7,315,310 B2 | 1/2008 | Sakamoto et al. |
| 7,400,325 B1 * | 7/2008 | Gimby et al. ................ 345/421 |
| 7,439,988 B1 * | 10/2008 | Parikh et al. ................ 345/620 |
| 7,466,322 B1 * | 12/2008 | Moreton et al. ............. 345/620 |
| 2003/0095137 A1 | 5/2003 | Lu et al. |

* cited by examiner

APPARATUS, SYSTEM, AND METHOD FOR DETERMINING CLIPPING DISTANCES

BRIEF DESCRIPTION OF THE INVENTION

The invention relates generally to graphics processing. More particularly, the invention relates to an apparatus, system, and method for determining clipping distances.

BACKGROUND OF THE INVENTION

Conventional graphics processing systems sometimes implement techniques for clipping graphics primitives. Clipping typically refers to a set of operations that determine which portion of a graphics primitive is to be displayed with respect to a set of clipping planes. Various techniques have been developed for clipping graphics primitives. Examples of these techniques include the Cohen-Sutherland technique, the Liang-Barsky technique, the Sutherland-Hodgeman technique, and the Weiler technique. Of these techniques, the Sutherland-Hodgeman technique is perhaps the most commonly used.

FIG. 1 illustrates an example of a graphics primitive 100 that is clipped in accordance with a conventional clipping technique, such as the Sutherland-Hodgeman technique. As illustrated in FIG. 1, the graphics primitive 100 is defined by a set of vertices ($V_0$, $V_1$, $V_2$), such that different pairs of the vertices define various edges of the graphics primitive 100. For example, the pair of vertices ($V_0$, $V_1$) define an edge 102 of the graphics primitive 100. In the illustrated example, each vertex $V_i$ is represented by a set of coordinates ($x_i$, $y_i$, $z_i$, $w_i$) in homogeneous space. For example, the vertex $V_0$ is represented by a set of coordinates ($x_o$, $y_o$, $z_o$, $w_o$), and the vertex $V_1$ is represented by a set of coordinates ($x_l$, $y_l$, $z_l$, $w_l$).

Referring to FIG. 1, the graphics primitive 100 is clipped with respect to a particular clipping plane 104 that defines a viewing region. The clipping plane 104 can be, for example, a left plane (i.e., x=−w plane), a right plane (i.e., x=+w plane), a bottom plane (i.e., y=−w plane), a top plane (i.e., y=+w plane), a near plane (i.e., z=−w plane), or a far plane (i.e., z=+w plane). To clip the graphics primitive 100 with respect to the clipping plane 104, the conventional clipping technique determines a clipping distance $d_i$ of each vertex $V_i$ with respect to the clipping plane 104. If the vertex $V_i$ lies inside of the clipping plane 104, the clipping distance $d_i$ is typically assigned a positive value. On the other hand, if the vertex $V_i$ lies outside of the clipping plane 104, the clipping distance $d_i$ is typically assigned a negative value. For example, to clip the edge 102 with respect to the clipping plane 104, the conventional clipping technique determines a clipping distance $d_0$ of the vertex $V_0$ as well as a clipping distance $d_1$ of the vertex $V_1$. Once the clipping distances $d_0$ and $d_1$ are determined, the conventional clipping technique determines a new vertex $V_a$, which corresponds to an intersection of the edge 102 with respect to the clipping plane 104. In particular, the new vertex $V_a$ is represented by a set of coordinates ($x_a$, $y_a$, $z_a$, $w_a$), which are determined based on the clipping distances $d_0$ and $d_1$, the set of coordinates ($x_o$, $y_o$, $z_o$, $w_o$), and the set of coordinates ($x_l$, $y_l$, $z_l$, $w_l$).

Conventional clipping techniques are commonly implemented using micro-code, such that a clipping program specifies a sequence of clipping operations to be performed. In accordance with such implementation, a processing time to clip a graphics primitive is typically dependent upon a complexity and a size of the clipping program. Unfortunately, a conventional clipping technique typically involves performing different types of operations for different clipping planes, and implementing these operations using micro-code often results in a clipping program that is undesirably complex and long.

For example, in the case of the Sutherland-Hodgeman technique, operations to determine a clipping distance $d_i$ of a vertex $V_i$ is typically dependent upon which clipping plane is involved. The following represents a portion of a conventional clipping program to determine the clipping distance $d_i$:

(1) If left plane
   then $d_i = w_i − x_i$
   Else branch
(2) If right plane
   then $d_i = w_i − x_i$
   Else branch
(3) If bottom plane
   then $d_i = w_i − y_i$
   Else branch
(4) If top plane
   then $d_i = w_i + y_i$
   Else branch
(5) If near plane
   then $d_i = w_i − z_i$
   Else branch
(6) If far plane
   then $d_i = w_i + z_i$ As can be appreciated, the clipping program includes separate sets of instructions and multiple branches to account for different clipping planes. As a result, the clipping program can be slow to execute, thus translating into a processing time that is longer than desired. Also, the processing time can be relatively unpredictable, particularly since a number of branches to be performed is dependent upon which clipping plane is involved. In addition, a size of the clipping program can lead to inefficiencies in terms of enhanced storage requirements.

It is against this background that a need arose to develop the apparatus, system, and method described herein.

SUMMARY OF THE INVENTION

In one aspect, the invention relates to a graphics processing apparatus. In one embodiment, the graphics processing apparatus includes a clipping unit and an instruction memory connected to the clipping unit. The instruction memory includes a clipping program to direct the clipping unit to perform clipping operations. The clipping program includes a clipping distance instruction to determine a clipping distance with respect to any of a set of clipping planes.

In another embodiment, the graphics processing apparatus includes a clipping unit. The clipping unit is responsive to a common set of instructions to: (i) perform a first set of clipping operations if a graphics primitive is to be clipped with respect to a first clipping plane of a set of clipping planes; and (ii) perform a second set of clipping operations if the graphics primitive is to be clipped with respect to a second clipping plane of the set of clipping planes. The first set of clipping operations and the second set of clipping operations are different.

In another aspect, the invention relates to a graphics processing method. In one embodiment, the graphics processing method includes providing an instruction to determine a clipping distance. The graphics processing method also includes, responsive to the instruction: (i) identifying which of a set of clipping planes with respect to which the clipping distance is to be determined; and (ii) performing a first set of operations if the clipping distance is to be determined with respect to a first clipping plane of the set of clipping planes.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings, in which.

Like reference numerals are used to refer to corresponding components of the drawings.

DETAILED DESCRIPTION

Figure 1:
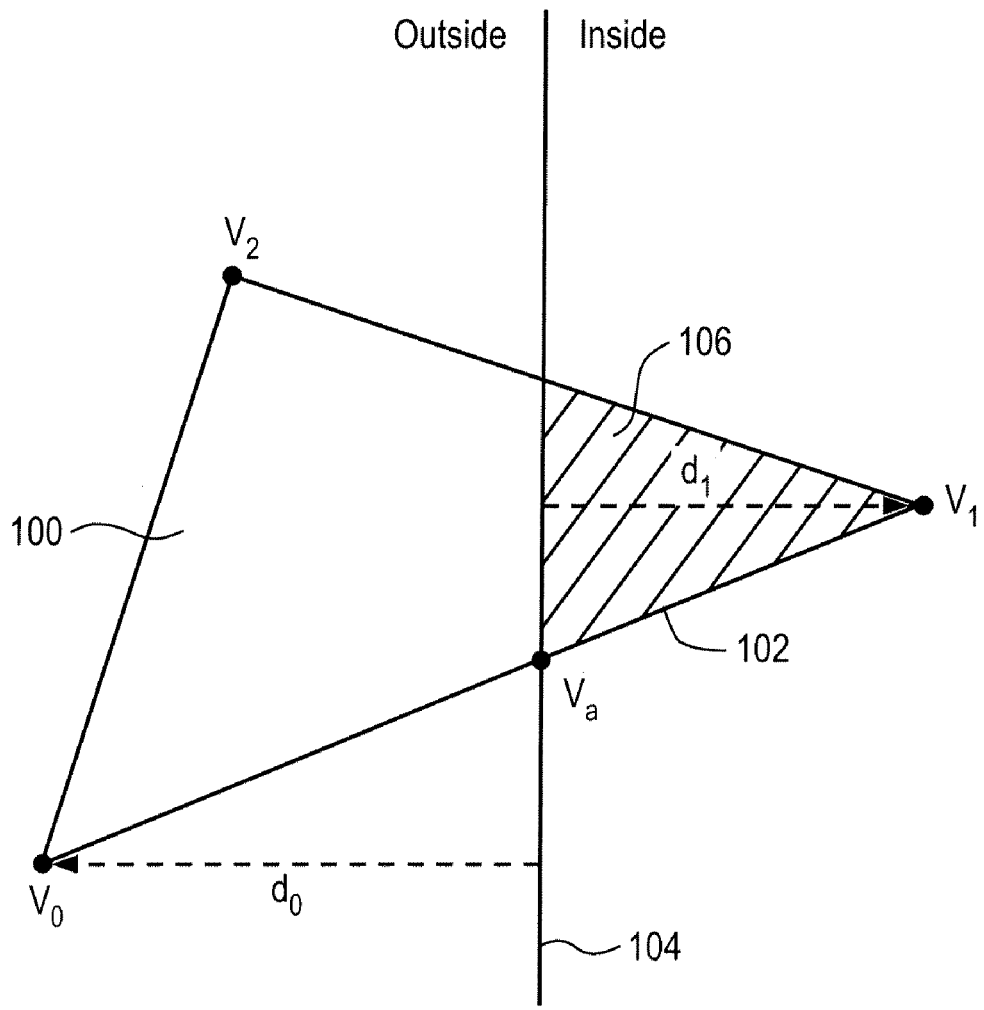
FIG. 1 illustrates an example of a graphics primitive that is clipped in accordance with a conventional clipping technique.
Figure 2:
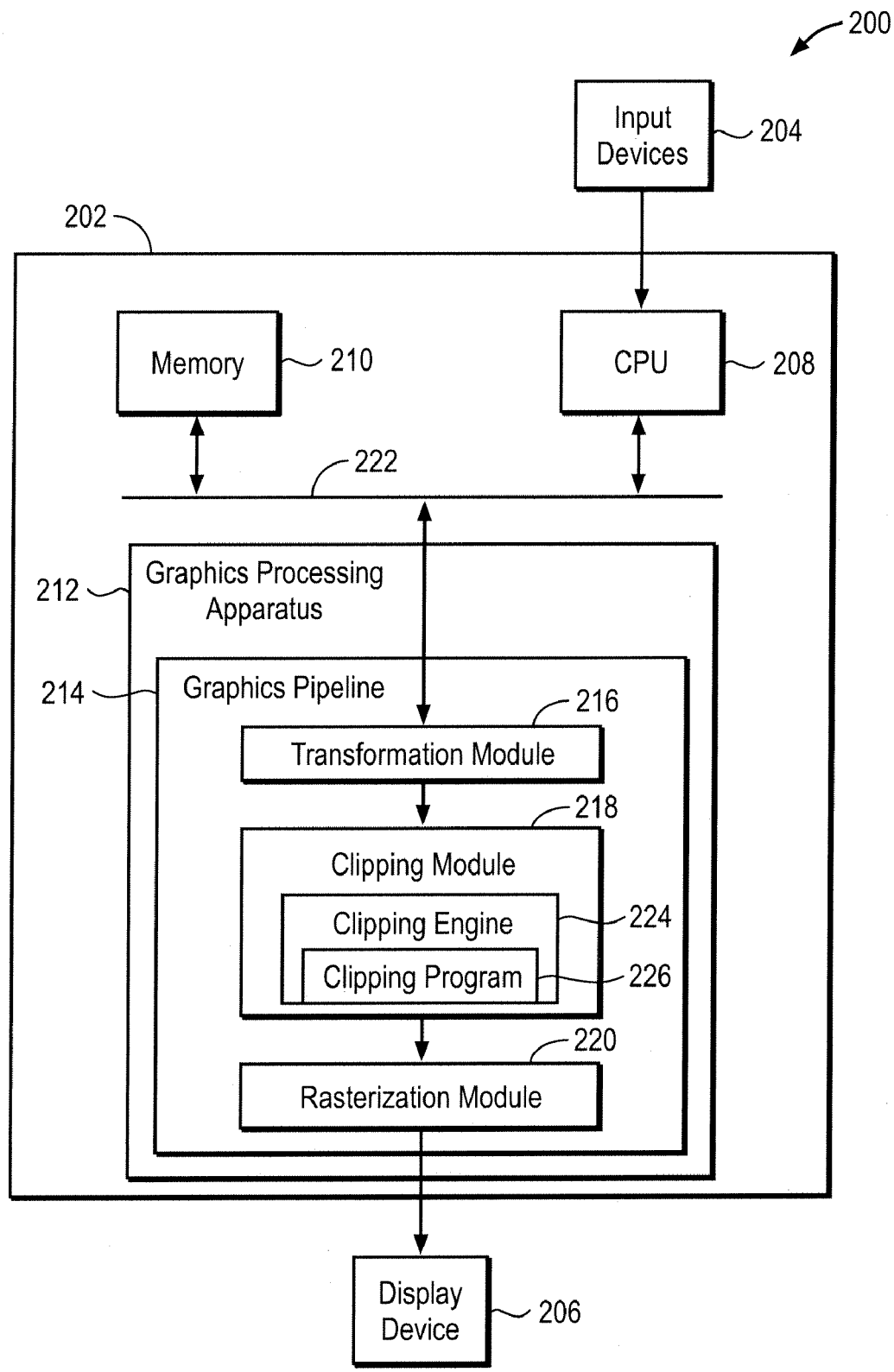
FIG. 2 illustrates a computer system that is implemented in accordance with an embodiment of the invention.

FIG. 2 illustrates a computer system 200 that is implemented in accordance with an embodiment of the invention. The computer system 200 includes a computer 202, which can be, for example, a desktop computer, a server computer, a laptop computer, a palm-sized computer, a tablet computer, a game console, a portable wireless terminal such as a personal digital assistant or a cellular telephone, a computer-based simulator, or any other device with data processing capability. As illustrated in FIG. 2, the computer 202 is connected to a set of one or more input devices 204, which can include, for example, a keyboard and a mouse. The computer 202 is also connected to a display device 206, which can be, for example, a television set, a Cathode Ray Tube ("CRT") monitor, or a Liquid Crystal Display ("LCD") monitor.

The computer 202 includes a Central Processing Unit ("CPU") 208, which is connected to a memory 210 over a bus 222. The memory 210 can include, for example, a Random Access Memory ("RAM") and a Read Only Memory ("ROM"). As illustrated in FIG. 2, the computer 202 also includes a graphics processing apparatus 212 that is connected to the CPU 208 and the memory 210 over the bus 222. The graphics processing apparatus 212 can be, for example, a Graphics Processing Unit ("GPU").

In the illustrated embodiment, the graphics processing apparatus 212 performs a number of operations to display an object using the display device 206. Referring to FIG. 2, the graphics processing apparatus 212 includes a graphics pipeline 214, which includes a number of modules that are connected to one another and that form different stages of the graphics pipeline 214. In particular, the graphics pipeline 214 includes a transformation module 216, a clipping module 218, and a rasterization module 220. While three modules are illustrated in FIG. 2, it is contemplated that the graphics pipeline 214 can include more or less modules depending on the particular implementation. It is also contemplated that these modules can be combined, sub-divided, or re-ordered for another implementation.

As illustrated in FIG. 2, the transformation module 216 receives a set of graphics primitives that represent the object to be displayed. Examples of the graphics primitives include one-dimensional graphics primitives, such as lines, and two-dimensional graphics primitives, such as polygons. Referring to FIG. 2, the transformation module 216 performs a number of transformation operations on the graphics primitives. For example, coordinate data of vertices defining the graphics primitives can be rotated, scaled, translated, or converted from one coordinate space into another coordinate space. It is also contemplated that color data, specularity data, or texture data of the vertices can be modified, such as in connection with lighting operations. The transformation module 216 then delivers the graphics primitives that have been transformed in such manner to the clipping module 218.

Referring to FIG. 2, the clipping module 218 next clips the graphics primitives with respect to a set of clipping planes to produce clipped graphics primitives. The clipping module 218 then delivers the clipped graphics primitives to the rasterization module 220. In the illustrated embodiment, the clipping planes define a viewing region, which can be a two-dimensional viewing area or a three-dimensional viewing volume. It is also contemplated that the clipping planes can alternatively, or in conjunction, include a w=0 plane in homogeneous space. As can be appreciated, the w=0 plane can be positioned at a viewpoint of the viewing region, such that portions of the object that lie on a w<0 side of that plane are behind the viewpoint and are, thus, not visible. The clipping module 218 serves to increase efficiency of the graphics pipeline 214, as further processing on portions of the object that lie outside the viewing region need not be performed. Also, by using the w=0 plane, the clipping module 218 serves to avoid further processing on portions of the object that are behind the viewpoint.

In the illustrated embodiment, the clipping module 218 includes a clipping engine 224, which performs a number of clipping operations on the graphics primitives to produce the clipped graphics primitives. As illustrated in FIG. 2, the clipping engine 224 is implemented as a micro-coded engine that includes a clipping program 226. Advantageously, the clipping engine 224 operates in accordance with an improved technique that allows the clipping program 226 to be compact and to have little or no branching. In particular, a common set of instructions is defined for the clipping planes, and this common set of instructions allow the clipping program 226 to be implemented in a manner that is clipping plane-insensitive, thus avoiding a need for separate sets of instructions and multiple branches to account for different clipping planes. Stated in another way, this common set of instructions allow the clipping program 226 to be implemented at a higher level of abstraction, such that operations that are specific to each of the clipping planes are effectively shielded at that higher level of abstraction. Instead, these clipping plane-specific operations are readily implemented within underlying hardware resources of the clipping engine 224. In such manner, the clipping program 226 can be quickly executed in a deterministic manner, thus translating into a processing time that is shorter and more predictable as compared with a conventional clipping implementation. In addition, such improvement in processing time is achieved with little or no additional cost or complexity as compared with a conventional clipping implementation.

As illustrated in FIG. 2, the rasterization module 220 next performs a number of interpolation operations on the clipped graphics primitives to produce a set of pixels that represent the object to be displayed. For example, coordinate data of vertices defining the clipped graphics primitives can be interpolated to assign the pixels to represent the object. It is also contemplated that color data, specularity data, or texture data of the vertices can be interpolated in connection with pixel assignment. The rasterization module 220 then delivers the pixels for display using the display device 206.

The foregoing provides an overview of an embodiment of the invention. Attention next turns to FIG. 3, which illustrates the clipping module 218 that is implemented in accordance with an embodiment of the invention. The clipping module 218 includes a vertex memory 302, which stores a set of vertices defining a graphics primitive to be clipped. In the illustrated embodiment, a particular vertex $V_i$ defining the graphics primitive is represented by a set of coordinates ($x_i$, $y_i$, $z_i$, $w_i$) in homogeneous space. The vertex memory 302 can be implemented using, for example, a RAM.

Figure 3:
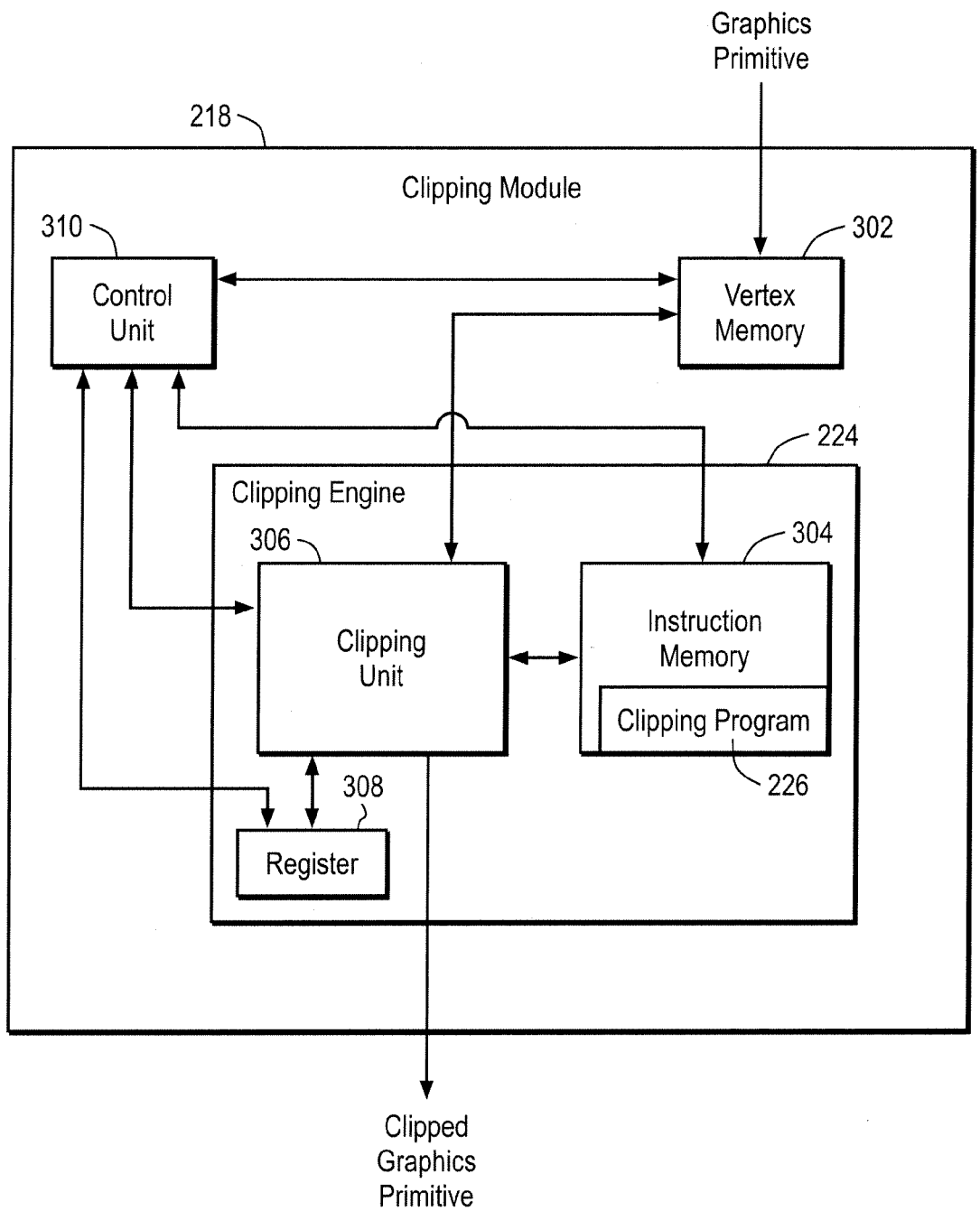
FIG. 3 illustrates a clipping module that is implemented in accordance with an embodiment of the invention.

As illustrated in FIG. 3, the clipping module 218 also includes the clipping engine 224, which clips the graphics primitive with respect to a set of clipping planes to produce a clipped graphics primitive. Referring to FIG. 3, the clipping engine 224 includes an instruction memory 304 that stores the clipping program 226. The instruction memory 304 can be implemented using, for example, a ROM.

In the illustrated embodiment, the clipping program 226 is implemented using a clipping distance instruction to determine a clipping distance $d_i$ of the vertex $V_i$. In particular, the clipping distance instruction serves as a common instruction to determine the clipping distance $d_i$ with respect to any of the clipping planes. In the illustrated embodiment, the clipping distance instruction can be represented as CLIP $V_i$, where CLIP corresponds to an operation code or opcode, and the vertex $V_i$ corresponds to an operand. The opcode CLIP serves as a common opcode for the clipping planes and specifies a set of operations to be performed at a higher level of abstraction, such that clipping plane-specific differences in those operations are effectively shielded at that higher level of abstraction.

The following represents a portion of the clipping program 226 to determine the clipping distance $d_i$:

$$d_i = \text{CLIP } V_i \quad (1)$$

As can be appreciated, the clipping distance instruction allows the clipping program 226 to be implemented in a compact manner that has no branching. As a result, the clipping program 226 can be quickly executed in a deterministic manner, thus translating into a processing time that is shorter and more predictable as compared with a conventional clipping implementation. Indeed, for certain implementations, the clipping distance $d_i$ can be determined in a single clock. In addition, a compact size of the clipping program 226 translates into reduced storage requirements for the clipping program 226.

Referring to FIG. 3, the clipping engine 224 also includes a clipping unit 306, which is connected to the vertex memory 302 and the instruction memory 304. The clipping unit 306 is responsive to the clipping program 226 and performs a set of clipping operations by accessing the vertices that are stored in the vertex memory 302. The clipping unit 306 can be implemented using, for example, a vector engine that performs various operations, such as additions, compares, multiplications, reciprocals, and subtractions.

In the illustrated embodiment, the clipping unit 306 is implemented to perform various sets of clipping plane-specific operations. In particular, the clipping unit 306 is responsive to the clipping distance instruction, and, depending upon which clipping plane is involved, the clipping unit 306 performs a particular set of operations to determine the clipping distance $d_i$. For example, the clipping unit 306 performs a first set of operations, namely $d_i = w_i - x_i$, if the clipping distance $d_i$ is to be determined with respect to a left plane. As another example, the clipping unit 306 performs a second set of operations, namely $d_i = w_i + x_i$, if the clipping distance $d_i$ is to be determined with respect to a right plane. As a further example, the clipping unit 306 performs a third set of operations, namely $d_i = w_i$, if the clipping distance $d_i$ is to be determined with respect to a w=0 plane. In such manner, clipping plane-specific operations, which are effectively shielded at the level of the clipping program 226, are readily implemented at a hardware level within the clipping unit 306.

As illustrated in FIG. 3, the clipping engine 224 further includes a clipping plane register 308, which is connected to the clipping unit 306. In the illustrated embodiment, the clipping plane register 308 maintains a clipping plane identifier, and the clipping unit 306 accesses the clipping plane identifier to identify which of the clipping planes with respect to which the clipping distance $d_i$ is to be determined. Once clipping is completed with respect to that clipping plane, the clipping plane identifier is updated to specify another one of the clipping planes, and so on until each of the clipping planes with respect to which clipping is required has been processed. It is contemplated that the clipping plane register 308 can be implemented at various locations, such as within the clipping unit 306. It is further contemplated that the clipping distance instruction can include the clipping plane identifier as an operand, such that the clipping plane register 308 can be omitted for certain implementations.

Referring to FIG. 3, the clipping module 218 further includes a control unit 310, which is connected to and coordinates operations that are performed by the vertex memory 302, the instruction memory 304, the clipping unit 306, and the clipping plane register 308. The control unit 310 can be implemented in any suitable manner, such as using computer code, hardwired circuitry, or a combination of computer code and hardwired circuitry.

Figure 4:
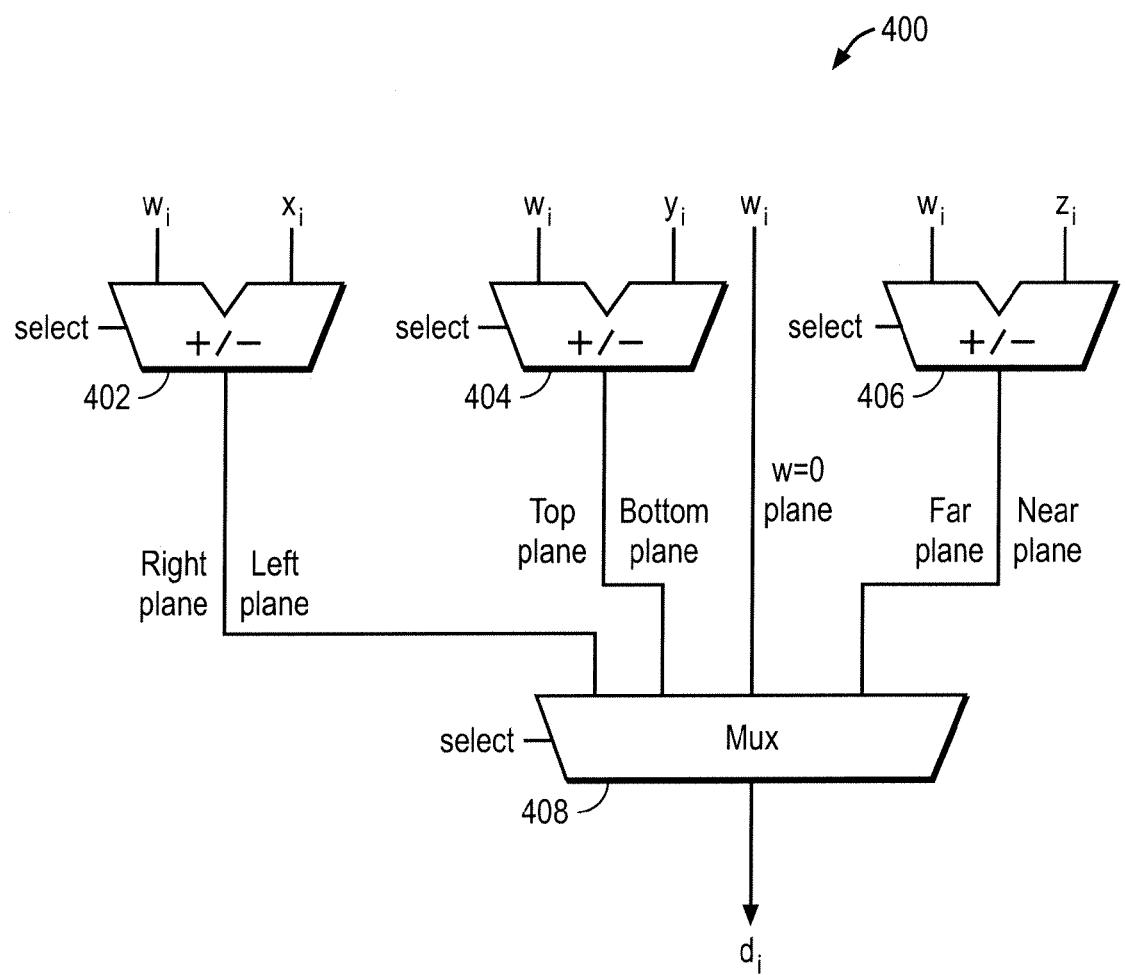
FIG. 4 illustrates a vector engine that is implemented in accordance with an embodiment of the invention.

FIG. 4 illustrates a vector engine 400 that can be implemented within the clipping unit 306, according to an embodiment of the invention. The vector engine 400 is responsive to a clipping distance instruction, and, depending upon which clipping plane is involved, the vector engine 400 is implemented to perform a particular set of operations to determine a clipping distance $d_i$ of a vertex $V_i$.

Referring to FIG. 4, the vector engine 400 includes a set of adders/subtractors 402, 404, and 406. While three adders/subtractors are illustrated in FIG. 4, it is contemplated that more or less adders/subtractors can be included depending on the particular implementation. Each of the adders/subtractors 402, 404, and 406 receives a pair of inputs and, depending upon a particular clipping plane that is involved, either adds or subtracts its inputs to produce a resulting output. For example, the adder/subtractor 402 receives a pair of input signals representing $w_i$ and $x_i$ and produces an output signal that represents either $w_i + x_i$ or $w_i - x_i$, depending whether the clipping plane is a right plane or a left plane. As illustrated in FIG. 4, output ends of the adders/subtractors 402, 404, and 406 are connected to a multiplexer ("mux") 408. The mux 408 receives an input signal representing $w_i$ as well as output signals that are produced by the adders/subtractors 402, 404, and 406, and, depending upon a particular clipping plane that is involved, the mux 408 issues one of these signals to represent the clipping distance $d_i$ with respect to that clipping plane.

Figure 5:
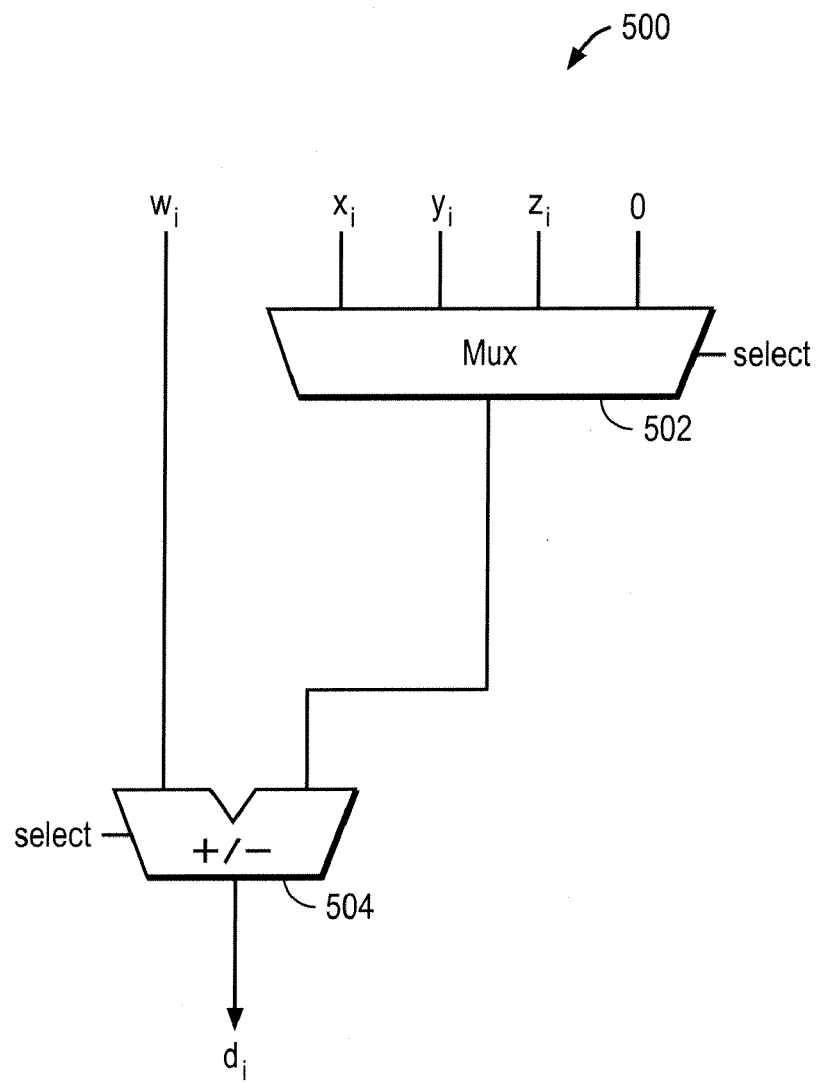
FIG. 5 illustrates a vector engine that is implemented in accordance with another embodiment of the invention.

FIG. 5 illustrates a vector engine 500 that can be implemented within the clipping unit 306, according to another embodiment of the invention. Similar to the vector engine 400, the vector engine 500 is responsive to a clipping distance instruction, and, depending upon which clipping plane is involved, the vector engine 500 is implemented to perform a particular set of operations to determine a clipping distance $d_i$ of a vertex $V_i$.

Referring to FIG. 5, the vector engine 500 includes a mux 502 and an adder/subtractor 504 that is connected to an output end of the mux 502. The mux 502 receives input signals representing $x_i$, $y_i$, and $z_i$ as well as an input signal representing a null value, and, depending upon a particular clipping plane that is involved, the mux 502 issues one of these signals to the adder/subtractor 504. As illustrated in FIG. 5, the adder/subtractor 504 receives another input signal representing $w_i$, and, depending upon a particular clipping plane that is involved, the adder/subtractor 504 performs either an addition or subtraction to produce a resulting output signal that represents the clipping distance $d_i$ with respect to that clipping plane.

At this point, advantages and features of some embodiments of the invention can be appreciated. Some embodiments of the invention operate in accordance with an improved technique that allows a clipping program to be compact and to have little or no branching. In particular, a clipping distance instruction is defined so as to allow the clipping program to be clipping plane-insensitive, thus avoiding a need for separate sets of instructions and multiple branches to account for different clipping planes. Stated in another way, the clipping distance instruction allows the clipping program to be implemented at a higher level of abstraction, such that clipping plane-specific operations need not be visible at that higher level of abstraction. Rather, these clipping plane-specific operations are readily implemented within underlying hardware resources, with little or no additional cost or complexity as compared with a conventional clipping implementation. In such manner, the clipping program can be quickly executed in a deterministic manner, thus translating into a processing time that is shorter and more predictable as compared with a conventional clipping implementation.

It should be appreciated that the specific embodiments of the invention described above are provided by way of example, and various other embodiments are encompassed by the invention.

Some embodiments of the invention relate to a computer storage product with a computer-readable medium having computer code thereon for performing various computer-implemented operations. The media and computer code may be those specially designed and constructed for the purposes of the invention, or they may be of the kind well known and available to those having skill in the computer software arts. Examples of computer-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as floptical disks; carrier wave signals; and hardware devices that are specially configured to store and execute program code, such as Application-Specific Integrated Circuits ("ASICs"), Programmable Logic Devices ("PLDs"), and ROM and RAM devices. Examples of computer code include, but are not limited to, micro-code or micro-instructions, machine instructions, such as produced by a compiler, and files containing higher-level instructions that are executed by a computer using an interpreter. For example, an embodiment of the invention may be implemented using Java, C++, or other object-oriented programming language and development tools. Additional examples of computer code include, but are not limited to, control signals, encrypted code, and compressed code.

Some embodiments of the invention can be implemented using computer code in place of, or in combination with, hardwired circuitry. For example, with reference to FIG. 3, various components of the clipping module 218 can be implemented using computer code, hardwired circuitry, or a combination thereof.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, process operation or operations, to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

What is claimed is:

1. A graphics processing apparatus, comprising:
    an instruction memory including a single clipping distance instruction to determine a clipping distance with respect to any of multiple clipping planes, wherein the single clipping distance instruction is implemented in software and does not account for different ones of the clipping planes;
    a clipping plane register including a clipping plane identifier that specifies a particular one of the clipping planes with respect to which the clipping distance is to be determined; and
    a clipping unit connected to the instruction memory and the clipping plane register, wherein the clipping unit is implemented in hardware and is responsive to the single clipping distance instruction to perform clipping plane-specific operations for different ones of the clipping planes, wherein the clipping unit is configured to:
        (i) access the clipping plane register to identify the particular one of the clipping planes with respect to which the clipping distance is to be determined;
        (ii) perform a first set of clipping plane-specific operations implemented in hardware to determine the clipping distance, if the particular one of the clipping planes corresponds to a first clipping plane; and
        (iii) else if the particular one of the clipping planes corresponds to a second clipping plane, perform a second set of clipping plane-specific operations implemented in hardware to determine the clipping distance, wherein the first set of clipping plane-specific operations and the second set of clipping plane-specific operations are different.

2. The graphics processing apparatus of claim 1, wherein the clipping plane identifier initially specifies the first clipping plane, such that the clipping unit is configured to perform the first set of clipping plane-specific operations, and the clipping plane identifier is subsequently updated to specify the second clipping plane, such that the clipping unit is configured to perform the second set of clipping plane-specific operations.

3. The graphics processing apparatus of claim 1, wherein the clipping distance is determined for a vertex $V_i$ represented by a set of coordinates $(x_i, y_i, w_i)$ in homogeneous space.

4. The graphics processing apparatus of claim 3, wherein the clipping unit is configured to perform a set of operations represented as $w_i-x_i$, if the particular one of the clipping planes corresponds to a left plane.

5. The graphics processing apparatus of claim 3, wherein the clipping unit is configured to perform a set of operations represented as $w_i+x_i$, if the particular one of the clipping planes corresponds to a right plane.

6. The graphics processing apparatus of claim 3, wherein the clipping unit is configured to perform a set of operations represented as $w_i$, if the particular one of the clipping planes corresponds to a w=0 plane.

7. The graphics processing apparatus of claim 3, wherein the clipping unit is configured to perform a set of operations represented as $w_i-y_i$, if the particular one of the clipping planes corresponds to a bottom plane.

8. The graphics processing apparatus of claim 3, wherein the clipping unit is configured to perform a set of operations represented as $w_i+y_i$, if the particular one of the clipping planes corresponds to a top plane.

9. The graphics processing apparatus of claim 3, wherein the clipping unit is configured to perform a set of operations represented as $w_i-z_i$, if the particular one of the clipping planes corresponds to a near plane.

10. The graphics processing apparatus of claim 3, wherein the clipping unit is configured to perform a set of operations represented as $w_i+z_i$, if the particular one of the clipping planes corresponds to a far plane.

11. The graphics processing apparatus of claim 3, further comprising a vertex memory connected to the clipping unit and including the set of coordinates $(x_i, y_i, z_i, w_i)$.

12. The graphics processing apparatus of claim 1, wherein the clipping unit includes a vector engine that is responsive to the single clipping distance instruction to perform clipping plane-specific operations for different ones of the clipping planes.

13. The graphics processing apparatus of claim 1, wherein the single clipping distance instruction includes a common opcode to determine the clipping distance with respect to any of the clipping planes.

* * * * *